Figure 1:
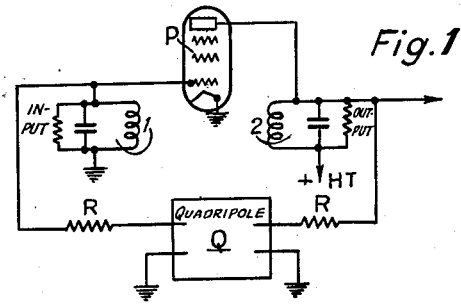

Dec. 2, 1952

H. CHIREIX 2,620,468

ARRANGEMENT FOR CONVERTING FREQUENCY-MODULATED WAVES

Filed April 6, 1950

INVENTOR

Henri CHIREIX

By *Fritz G. Hochwald*

Agent

Patented Dec. 2, 1952

2,620,468

UNITED STATES PATENT OFFICE 2,620,468

ARRANGEMENT FOR CONVERTING FREQUENCY-MODULATED WAVES

Henri Chireix, Paris, France, assignor to Societe Francaise Radio-Electrique, a corporation of France Application April 6, 1950, Serial No. 154,278
In France April 14, 1949

4 Claims. (Cl. 332—68)

It is often required, in frequency-modulated transmissions, to convert a frequency-modulated wave which has a certain frequency deviation and which, in the remainder of the present specification, will be called wave I, into another frequency-modulated wave which will be called wave II, said wave II being of a different frequency from wave I and having a different frequency deviation from that of wave I.

According to the known techniques, this result is obtained by multiplying or dividing the frequency of the wave I; but this results in the respective frequencies of the waves I and II being in a simple whole ratio, as are also the associated frequency deviations. It is obviously possible to eliminate the first of these two drawbacks by furthermore subjecting the wave I to a frequency-change; but it is impossible to eliminate the second. In addition, a problem which is difficult to solve arises in such a method from the production of parasitic waves (whistles), which have to be eliminated with the greatest care.

My invention has specifically for its object to obtain, from a frequency-modulated wave I, a wave II which is also frequency-modulated, both waves having arbitrarily connected carrier frequencies and likewise arbitrary frequency deviations. More particularly, it has for its object to effect:

either "frequency compression" in receivers, the wave II having a carrier frequency of the same order of magnitude as the wave I, but a reduced frequency deviation;

or "frequency expansion" in transmitters, the wave II again having a carrier frequency of the same order of magnitude as the wave I, but a frequency deviation which is increased within considerable limits.

The means used by the invention are in principle the following:

The wave II is supplied by a self excited oscillator, the self-oscillation frequency of which is controlled by the frequency-modulated wave I. This control is effected by introducing into the reaction path of the self excited oscillator, a phase difference that depends on the instantaneous frequency of the wave I; this result is obtained by constituting the reaction path by a first frequency-changer which is subjected to the action of the wave supplied by the self excited oscillator and to the action of the wave I, and which is followed by a retardation line or an equivalent device, and finally by a second frequency-changer subjected to the action of the currents flowing through the retardation line and to the action of the wave I, the output of said second frequency-changer being in its turn coupled to the input of the self excited oscillator.

The operation of a system thus constituted will be more clearly understood by means of the accompanying figures and of the description that refers thereto.

Fig. 1 relates to the fundamental arrangement.

Figure 2:
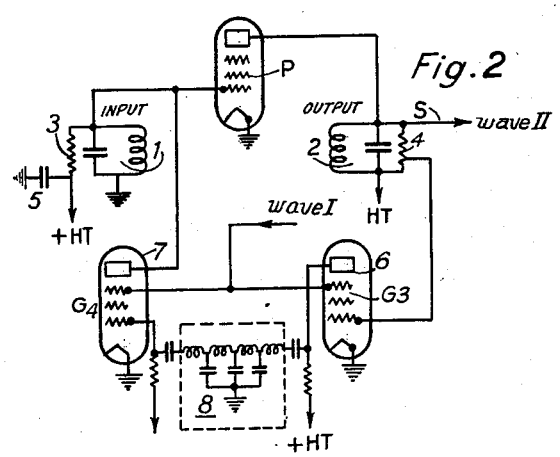

Fig. 2 shows, by way of a non-limitative example, a practical diagram that enables the purpose of the invention to be attained.

Figure 3:
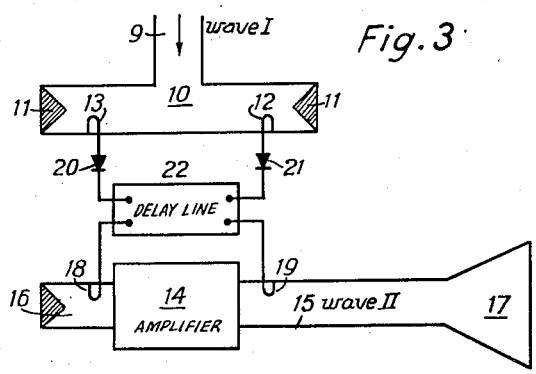

Fig. 3 relates to an example of an arrangement according to the invention, applicable to the case of ultra-high frequencies.

Figure 4:
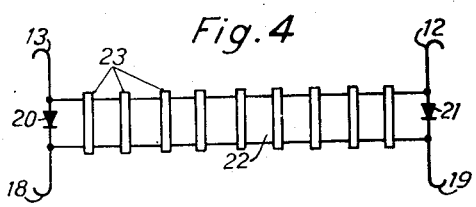

Finally, Fig. 4 shows a constructional example of a retardation line which is particularly suitable in the case of ultra-high frequencies.

Fig. 1 shows a self excited oscillator containing two damped resonant circuits 1, 2 which are tuned to the same frequency. These circuits respectively form the input and output circuits of a pentode P. They are connected to one another externally by means of a quadripole Q which is formed, for example, by a retardation line and resistors R of high value.

If, for the natural tuning frequency of the circuits 1 and 2, the quadripole has a phase rotation $\pi$ (or an odd multiple of $\pi$), the self excited oscillator will oscillate (provided that the attenuation of the reaction path is less than the gain of the pentode P) on the natural tuning frequency of the circuits. The transit time through the pentode is assumed to be negligible.

For a phase rotation introduced by the quadripole exceeding $\pi$ by $\Delta\varphi$, the self excited oscillator will still oscillate, but at a lower frequency. Since the sum of the phase rotations introduced round the loop, i. e. the closed circuit formed by the amplifier and its negative feed-back circuit, has to remain constant, each of the circuits 1 and 2 will have to cause the phase of the voltage to advance $$\frac{\Delta\varphi}{2}$$

if the two circuits 1 and 2 are identical. It is found that this is definitely the case if the frequency of the oscillation decreases.

The reverse obviously occurs if the phase rotation introduced by the quadripole becomes less than $\pi$ by $\Delta\varphi$.

It can be seen on the other hand that the higher the Q-factor of the circuits 1 and 2, the smaller will be the frequency deviation produced, and conversely.

In the light of the foregoing indications, the operation of the system according to the invention, which is shown diagrammatically in Fig. 2, will be more clearly understood.

The self-excited oscillator is formed by the pentode P associated with the circuits 1, 2 which are tuned to the same frequency and are damped by the resistors 3 and 4; 5 is a grounded decoupling capacitor. The quadripole of Fig. 1, with the associated resistors, is in this case replaced by the system comprising the two multi-grid tubes 6 and 7 and the retardation line 8. The tubes 6 and 7 effect two successive frequency-changes, the wave I being fed in parallel to the two grids $G_3$ and $G_4$.

It can be seen that a wave, the frequency of which in absolute value is the difference between the frequencies of the waves I and II and which is therefore a wave of variable frequency, passes in particular at every instant through the line 8 which, according to the band of frequencies contemplated, may be of different forms such as an artificial line, a section of cable, a quadripole, a delay network, or the like. Consequently, for this intermediate frequency, a variable phase rotation is produced. After the second frequency-change, at 7, there is found, inter alia, the frequency of the wave II that has undergone the same variable phase rotation. This wave II is then fed to the circuit 1 and the frequency of said wave is thus determined unambiguously. This wave is collected at S, for any purpose for which it may be required.

It is now necessary to consider successively the case in which frequency compression is effected and that in which frequency expansion is effected.

In the case of frequency compression, i. e. in the case in which $f_1$, which is the mean frequency of the wave I, is made lower than $f_2$ which is the mean frequency of the wave II, the following reasoning may be used for explaining the operation of the system: When $f_1$ suddenly increases by $\Delta f_1$, the beat frequency passing through 8 suddenly decreases, which corresponds to a relative advance of the phase and to a sudden increase in the frequency $f_2$. The final advance is however reduced with respect to its original value owing to the fact that $f_2$ has increased. The system is perfectly stable and the behaviour is absolutely similar to that of an amplifier with negative feedback. If the Q-factor of the circuits 1 and 2 is high, $f_2$ will only vary very slightly and the final phase variation will be very nearly equal to the initial phase variation. A high degree of frequency compression will thus have been obtained. On the other hand, if the Q-factor of the circuits 1 and 2 is low, the phase variation at the final state will be very small with respect to its initial value and consequently the frequency $f_2$ will vary approximately the same quantity as the frequency $f_1$. Only a very slight compression of the frequencies will have been obtained.

In the case of frequency expansion, i. e. in the case in which $f_1$ is made greater than $f_2$, a reasoning identical with the foregoing shows that the final phase variation, when there is a sudden variation of frequency, is greater than the initial variation. It is found in this case that the behaviour is the same as that of an amplifier with positive feedback and stability cannot be ensured. For stability to be maintained, the initial repercussion on $f_2$ of a sudden variation of the frequency $f_1$ must remain smaller than said variation. If this condition is fulfilled, operation will be stable and the final variation of $f_2$ may be very much greater than the initial variation. An unstable system can be rendered stable by increasing the Q-factor of the circuits 1, 2, or better, by decreasing the delay produced by the line 8.

Fig. 2 shows an embodiment of the system according to the invention with conventional tubes. In the ultra-high frequency field, an equivalent diagram can be obtained by using as the oscillator a velocity-modulated amplifying tube of the two-cavity klystron type, or a travelling-wave amplifying tube having a wide band-pass, and conversely the wave I may be supplied by a reflex klystron or a wide band-pass amplifier formed by a travelling-wave tube. In any case, the output of the tube that supplies the wave II is fed back to the input end, so as to make the tube oscillate; but the necessary frequency-changers (6 and 7 in Fig. 2) are in this case preferably formed simply by crystal mixers. The wave II produced by the self-oscillator and the frequency-modulated wave I are jointly fed to the crystal at the output end of said self-oscillator.

The intermediate frequency wave of comparatively low frequency passes through the retardation line 8 in which it undergoes a phase variation which is proportional to the frequency of the resulting beat. It is then fed to a second mixing crystal together with the frequency-modulated wave I, so as to reconstitute the wave II which is fed to the input of the amplifier. The frequency-changes are effected, according to the known techniques, in waveguides or on coaxial cables.

If it is required to construct a frequency-modulated transmitter with a wide band-pass, it is necessary to effect frequency expansion. The wave I is in this case supplied by a reflex klystron, to the reflex grid of which the modulating currents are applied, and the back-coupled amplifier that supplies the wave II is preferably formed by a travelling-wave tube coupled to the transmitting antenna. For a degree of reaction of 2 decibels, the reflex klystron only has to supply one tenth of the final frequency deviation.

If it is required to construct the corresponding receiver, it will be advantageous to effect frequency compression. The wave I is in this case preferably obtained by directly amplifying the incoming wave by means of a travelling-wave tube, and the back-coupled amplifier that supplies the wave II is preferably formed by a velocity-modulated tube of the double or treble cavity klystron type. This tube is in this case connected to a limiter-discriminator system of narrow band-width.

Finally, it is possible to construct, according to the principle of the invention, relay stations wherein a tube of the klystron type, or a travelling-wave tube, excites the antenna of the transmitter on the wave II, whereas the wave I is received by the receiving antenna.

To terminate, a description will be given by way of a non-limitative example, of a diagram of an arrangement according to the invention, particularly applicable in the ultra-high frequency field. Said diagram is shown in Fig. 3.

The wave I arrives through a waveguide 9 and is fed to a T-junction 10, the arms of which are terminated by absorbing wedges 11. Loops 12, 13, arranged symmetrically with respect to the top of the T, collect energy.

The amplifier, of the travelling-wave type, is shown at 14 and is terminated, at the output and input ends, by waveguide elements 15 and 16.

The waveguide 15 is connected to the load represented by a horn 17, whereas the waveguide 16 is terminated by an absorbing wedge.

Coupling loops 18 and 19 are also provided. The crystal mixers 20 and 21 effect the two successive frequency-changes, and 22 represents the retardation line.

It can be seen that energy is collected at 19 from the amplifier 14 and mixed with the energy collected at 12, in the crystal mixer 21; this produces a beat frequency which passes through the line 22. Similarly, this energy at the beat frequency is mixed, by means of the mixer 20, with the energy of the wave I collected at 13. The energy obtained from the conversion is reintroduced by means of the coupling 18 into the input end of the amplifier 14.

The line 22 has to allow the beat frequencies to pass and exclude the ultra-high frequencies that correspond to $f_1$ and to $f_2$. For this purpose, it may be formed by a section of cable of high dielectric losses, the attenuation of which is proportional to the frequency; or, according to the construction shown in Fig. 4, by an air dielectric cable held in position by dielectric washers 23 which are uniformly distributed so as to form a line that has a relatively low critical frequency. The crystal mixers 20 and 21 form the load which is matched with this line according to the diagram of the figure.

What I claim is:

1. An arrangement for non-harmonically converting a first frequency-modulated wave into a second wave having both a different mean frequency and a different frequency deviation, comprising in combination: a self excited generator having an input oscillating circuit and an output oscillating circuit which are tuned to the mean frequency of the second wave, a first converter connected to said output oscillating circuit so as to receive the oscillations of the second wave, said first converter receiving on the other hand the oscillations of the first wave so as to produce an intermediate frequency, a delay device adapted to receive the intermediate frequency at the input terminals thereof and to transmit the same to the output terminals thereof with a phase difference which is variable according to the value of the intermediate frequency, and a second converter connected to the output terminals of said delay device and receiving on the other hand the oscillations of the first wave so as to reproduce, with delay, the oscillations of the second wave, said second converter having an output circuit connected to said input oscillating circuit of said self excited generator.

2. An arrangement as claimed in claim 1, said delay being a retardation line.

3. An arrangement as claimed in claim 1, said self excited generator being designed as an ultra-high frequency oscillator having input and output circuits including portions of waveguides, said converters including crystals and a T-shaped waveguide coupled thereto, said T-shaped waveguide receiving the first wave.

4. An arrangement as claimed in claim 1, said delay device being an air dielectric cable, and uniformly distributed discs of dielectric material holding said cable in position.

HENRI CHIREIX.

REFERENCES CITED

The following references are of record in the file of this patent:

UNITED STATES PATENTS

| Number | Name | Date |
|---|---|---|
| 2,136,479 | Trevor | Nov. 15, 1938 |
| 2,316,927 | Winlund | Apr. 20, 1943 |
| 2,358,152 | Earp | Sept. 12, 1944 |
| 2,382,198 | Bollinger | Aug. 14, 1945 |
| 2,490,007 | Peters | Nov. 29, 1949 |
| 2,498,242 | Boykin | Feb. 21, 1950 |